United States Patent [19]
Tanaka et al.

[11] Patent Number: 5,685,276
[45] Date of Patent: Nov. 11, 1997

[54] ENGINE CONTROL SYSTEM

[75] Inventors: Kenichiro Tanaka, Hiroshima; Tsukasa Harada, Tokyo; Yoshiyuki Shinya; Hiroshi Takagi, both of Hiroshima, all of Japan

[73] Assignee: Mazda Motor Corporation, Japan

[21] Appl. No.: 676,516

[22] Filed: Jul. 2, 1996

[30]     Foreign Application Priority Data

Jul. 3, 1995  [JP]  Japan .................................. 7-167331
Jun. 25, 1996 [JP]  Japan .................................. 8-164325

[51] Int. Cl.⁶ ............................................. F02M 51/00
[52] U.S. Cl. ................................................... 123/478
[58] Field of Search ............................. 123/478, 492, 123/493, 480, 491, 414, 416, 418; 364/431.04, 431.05

[56]         References Cited

U.S. PATENT DOCUMENTS 5,156,125  10/1992  Fukui et al. ............................ 123/414
5,245,972   9/1993  Denz et al. ............................ 123/478
5,572,975  11/1996  Gillbrand et al. ...................... 123/478

FOREIGN PATENT DOCUMENTS 4303141  10/1992  Japan .................................... 123/478

Primary Examiner—Raymond A. Nelli
Attorney, Agent, or Firm—Sixbey, Friedman, Leedom & Ferguson, P.C.; Gerald J. Ferguson, Jr.; Tim L. Brackett, Jr.

[57]               ABSTRACT

Engine control system for an engine equipped with a variable valve timing mechanism for altering intake valve duration delivers the amount of fuel required every engine cycle through leading and trailing injection, the duration times of which are complementarily altered according to changes in intake valve duration.

13 Claims, 11 Drawing Sheets

ENGINE CONTROL SYSTEM

BACKGROUND OF THE INVENTION

1. Field of the Invention

This invention relates to an engine control system for an internal combustion engine equipped with a variable valve timing feature which alters intake valve duration according to engine driving conditions, and, more particularly, to an internal combustion engine control system for executing fuel delivery at an intake manifold of the engine through a plurality of times of fuel injection every engine cycle.

2. Description of Related Art

In current general practice, automotive fuel injection systems inject a specific amount of fuel into an intake manifold during an interval of opening of the intake valve. In such a fuel injection system, both valve timing and fuel injection timing are precisely adjusted to compensate for a time needed for the fuel to travel from the intake manifold to the cylinder. Accordingly, the fuel injection is initiated before an intake cycle, for instance at a time point close to the initiation of a combustion cycle. Because, in this instance, a certain time is expended between the fuel injection and the opening of the intake valve, the engine experiences either a shortage or an overabundance of fuel supply in relation to the suitable amount of fuel during, in particular, transitional operation of the engine where an engine load is sharply increased or decreased, possibly causing misfires.

In order for the engine to deliver fuel neither too much nor too little, divided fuel injection systems in which the total amount of fuel necessary to be delivered every engine cycle is separately injected at a plurality of times, for instance two times, are employed. Japanese Patent Publication No. 7-62459 describes one of such divided fuel injection systems that injects separately a divided part of the total amount of fuel at a first optimum time (a leading injection time) within an interval for which the intake valve remains closed according to engine operating conditions to make the injected fuel contact to walls of the intake valve heads for a period as long as possible and to facilitate atomization of the fuel, and the remaining part of fuel at a second optimum time (a trailing injection time) in the intake cycle. The time of trailing fuel injection is determined as to finish injection of an amount of fuel sufficient to compensate for a deficient amount of fuel in regard to the amount of fuel to be delivered in response to an increase in amount of intake air after the preceding leading fuel injection by or before a predetermined time within the intake cycle. This divided fuel injection control provides a suitable amount of fuel delivery neither too much nor too little even during transitional operation of the engine.

On the other hand, there have been developed internal combustion engines equipped with variable timing valve mechanisms which alter intake valve duration (which means the length of time, measured in degrees of engine crankshaft rotation, that the intake valve remains open) according to changes in engine operating conditions. Some types of the engines of this kind are adapted and designed to adjust a time to injection fuel in response to closing the intake valve as, for instance, to set the termination of fuel injection at a time before the initiation of an intake cycle when the close time of the intake valve is advanced, and at a time in the intake cycle when the close time of the intake valve is retarded. One of this type of engine is known from, for instance, Japanese Unexamined Patent Publication No. 4-303141.

In cases where the variable valve timing control mechanism of the type controlling the intake valve duration is utilized by the engine equipped with the divided fuel injection feature, in order for the engine to deliver fuel more than enough into each cylinder from the intake manifold in which a fuel injector for the cylinder is disposed, the time of termination of the fuel injection must be determined in consideration of a time lag in fuel delivery and a period of time during which a fast intake air stream can bring fuel. For this reason, if the close time of the intake valve is advanced relatively to rotational angles of the crankshaft, the termination time of trailing fuel injection must be correspondingly advanced. Further, because, in order to deliver fuel more than enough even if a demanded amount of fuel is increased due to changes in engine operating conditions after the termination of leading fuel injection, the trailing fuel injection must terminate with a certain time left before the intake valve closes, it is necessary to advance the time of termination of the trailing fuel injection. Besides, because the amount of fuel necessitated every engine cycle is suitable to be grounded on the latest engine operating conditions, it is desirable to retard the detection of engine operating conditions, such as the amount of intake air introduced into the intake manifold, which is made immediately before commencement of the trailing fuel injection and based on which the amount of fuel to be delivered by the trailing fuel injection is determined. Together, from a standpoint of improved combustibility, fuel injection is desirable to be mainly executed during an interval or duration of the leading fuel injection suitable to achieve an improvement in fuel vaporization and atomization. This is because the leading fuel injection can be permitted to continue for a relatively long time before fuel combustion.

With the prior art divided fuel injection system, because an interval or duration of the trailing fuel injection is, however, established to conclude the delivery of an amount of fuel sufficient to compensate for a deficient amount of fuel in regard to the amount of fuel to be delivered in response to the amount of intake air increased after the preceding fuel injection by or before a predetermined time within an intake cycle, advancing the termination of the trailing fuel injection causes complementary advancement of the commencement of the trailing fuel injection and, then, brings both detection of engine operating conditions (such as the amount of intake air) and computation of the amount of fuel to be delivered on the basis of the updated engine operating conditions forward. This always makes it difficult to control the fuel injection according to updated engine operating conditions.

SUMMARY OF THE INVENTION

It is, therefore, an object of the invention to provide an engine control system of the type of divided fuel injection, which provides more precise fuel delivery, for use in an engine equipped with a variable valve timing mechanism.

It is another object of the invention to provide an engine control system of this type capable of delivering fuel into cylinders within an interval which permits efficient fuel supply into the cylinders and ovoids useless fuel consumption and reduces hydrocarbon emissions in the exhaust gas.

These objects of the invention are achieved by providing an engine control system for use in an internal combustion engine equipped with a variable valve timing mechanism which alters intake valve duration, measured in degrees of engine crankshaft rotation, that an intake valve remains open, and fuel injection control means for causing a fuel injector to deliver a total amount of fuel necessary every engine cycle into an intake manifold of the engine through a plurality of times of fuel injection, including at least leading fuel injection terminating while an intake valve remains closed and trailing fuel injection terminating at a predetermined time in an intake cycle. The engine control system comprising fuel amount computing means to compute a leading injection amount of fuel to be injected for a duration of the leading fuel injection computed on the basis of a total amount of fuel to be injected every engine cycle according to engine operating conditions before the leading fuel injection, and a difference of a total amount of fuel to be injected every engine cycle computed on the basis of engine operating conditions, updated after a termination of the leading injection duration, from the leading injection amount of fuel as the amount of fuel to be injected during the trailing fuel injection, and duration ratio control means for controlling a relative ratio between the durations of both leading fuel injection and trailing fuel injection in response to changes in the intake valve duration.

According to a specific embodiment of the invention, the duration ratio is altered to cause a specified reduction of the leading injection duration in response to advancement of a termination of the intake valve duration and, simultaneously with and complementarily to the specified reduction, to cause an extension of the leading injection duration. The leading injection duration may be adjusted by initiating the leading fuel injection at a timing fixed relatively to rotational angles of a crankshaft and retarding a termination of the leading fuel injection by a predetermined extension of time. Further, the duration ratio is altered to cause a specified reduction of the trailing injection duration when the intake valve duration is shortened, and, simultaneously with and complementarily to the specified reduction, an extension of the leading injection duration. The trailing fuel injection may be initiated at a timing fixed relatively to rotational angles of a crankshaft of the engine regardless of changes in the intake valve duration to control the trailing injection duration.

By means of the complementary change in duration of both leading and trailing fuel injection, an interval which permits efficient fuel supply into the cylinders is made use of. An expected shortage of fuel supply due to a reduction in duration of the trailing fuel injection is complementarily compensated during the leading fuel injection whose duration is extended in advance, providing an improvement of fuel delivery efficiency. Moreover, because, even when the timing of opening the intake valve is advanced, the trailing injection duration is not altered, the detection of engine operating conditions necessary to update the total amount of fuel based on which the amount of fuel delivered through the trailing fuel injection is delayed as late as possible.

In the case where the engine is equipped with a variable valve timing mechanism adapted and designed to advance a termination of the intake valve duration with changes in engine load in at least a specified range of engine operating conditions, there are caused a great reduction in the trailing injection duration and, simultaneously with and complementarily to the reduction, an extension in the leading injection duration during transitional operation of the engine where an engine load is sharply increased or decreased, providing the most suitable divided fuel injection control according to engine operating conditions and an improvement in fuel vaporization and atomization which always reduce useless fuel consumption and a hydrocarbon emission resulting from fuel combustion.

Further, the variable valve timing mechanism may be of a type of altering the intake valve duration with changes in engine operating conditions. In this instance, a reduction in the duration of the trailing fuel injection caused due to a shortened intake valve duration is complementarily compensated for through the leading fuel injection, suitably improving the efficiency of fuel delivery into the cylinders. Since, if initiating the duration of the trailing fuel injection at a time that an intake cycle starts, initiation of the trailing fuel injection can be retarded as late as possible, updating engine operating conditions necessary to compute the total amount of fuel can be made as close to the trailing fuel injection as possible. In any cases, if adjusting the intake valve duration by at least altering the time to close the intake valve, it is simplified to establish durations of the divided fuel injection.

According to another specific embodiment of the invention, the duration ratio is altered to retard a termination of the leading fuel injection by a predetermined extension of time which is extended with an increase in engine speed. The utilization may be made of a map of duration ratio characteristic curves defined in relation to intake valve duration and engine speed to execute the duration ratio alteration, with the effect of precise and simple duration ratio setting. Further, if terminating the trailing fuel injection in advance to attainment of the intake valve to the maximum valve lift, a fast intake air stream can bring fuel more than enough regardless of a demand for an increased amount of fuel due to changes in engine operating conditions, providing smooth fuel delivery.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE SPECIFIC EMBODIMENTS

Parts which are not of direct importance to the invention and parts which are purely of conventions construction will not be described in detail. For example, details of the variable valve timing mechanism, the fuel injection system, etc. which are necessary to engines to which the engine control system is incorporated will not be set out in detail since their construction and operation can be easily be arrived at by those skilled in the art.

Figure 1:
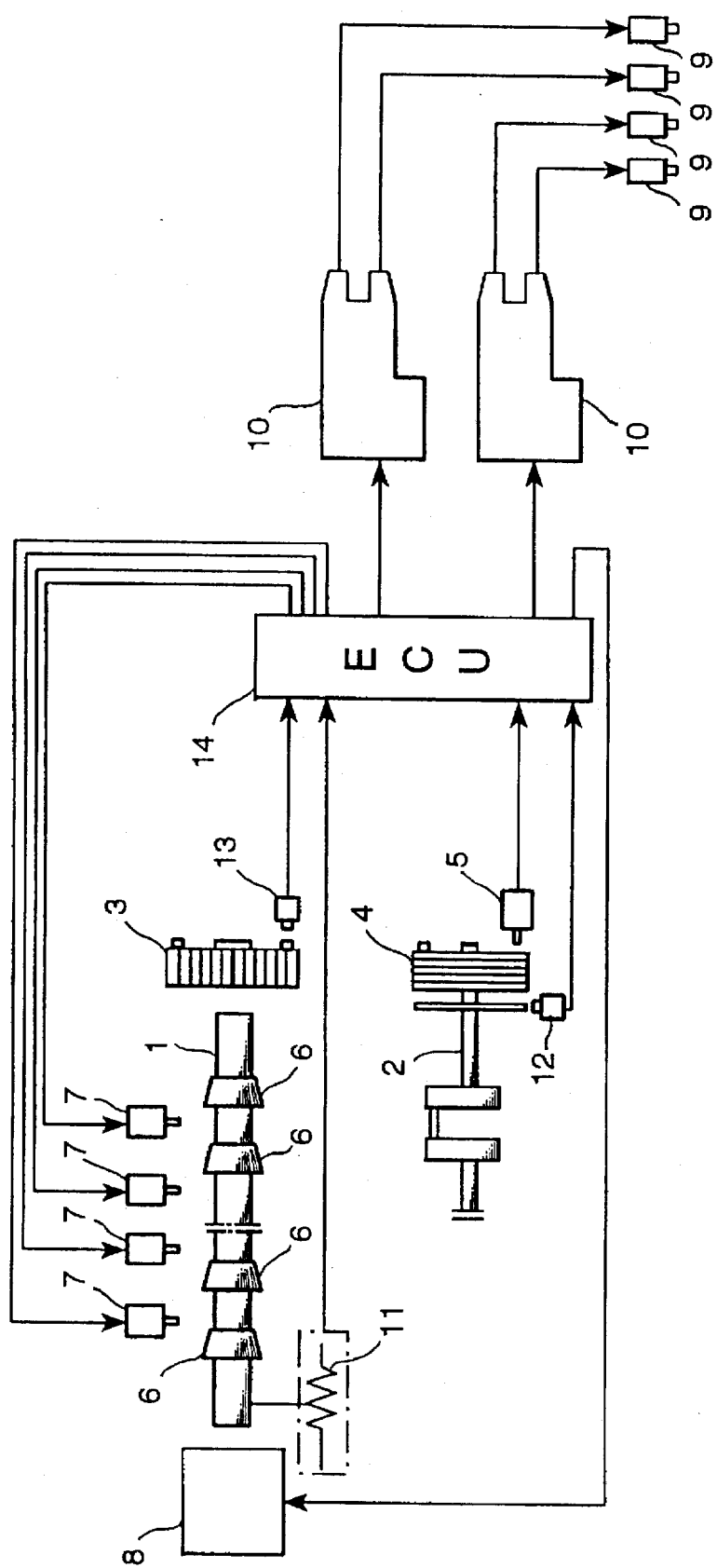
FIG. 1 is a schematic illustration of an engine control system in accordance with an embodiment of the invention.

Referring to the drawings in detail, in particular to FIG. 1 schematically showing an engine control system in accordance with an embodiment of the invention installed to, for instance, a four-cycle four-cylinder internal combustion engine, the engine has an intake valve actuating camshaft 1 and a crankshaft 2 which are equipped with a camshaft pulley 3 and a crankshaft pulley 4, respectively. These pulleys 3 and 4 are operationally connected with each other and driven by means of a drive belt (not shown). The camshaft 1 incorporates eight cams 6, two cams for each cylinder (for example one S port and one for P port at each cylinder). Each cam lobe having a variable outer diameter resulting from a frust-conical profile in the axial direction. The rotational speed of the crankshaft pulley 4 is detected as the rotational speed of the engine by means of a speed sensor 5 from which an engine speed signal Ne is output. The engine is provided with fuel injection valves 7, each of which is installed to a separate cylinder (not shown).

Camshaft 1 is equipped with an actuator 8 forming part of a variable valve timing mechanism which operates in a manner as to change the cams 6 in axial position with the effect of linearly altering the intake valve duration Tv (which shall mean the length of time, measured in degrees of engine crankshaft rotation, that the intake valve remains open). The variable valve timing mechanism causes relative rotation between the camshaft 1 and the camshaft pulley 3, and hence the crankshaft 2 to alter the open and close time of the intake valves (not shown). The cylinders are provided with ignition spark plugs 9 connected to the secondary circuits of ignition coils 10. One ignition coil 10 supplies a simultaneous spark to the first and fourth cylinders through the respective spark plugs 9, and the other ignition coil 10 supplies a simultaneous spark to the second and third cylinders through the spark plugs 9. The engine control system has various sensors, such as a position sensor 11 to monitor the axial position of the camshaft 1 to detect valve timing, an angle sensor 12 to monitor the angular position of the crankshaft 2 and to provide a crank angle signal SGT, and a cylinder differentiation sensor 13 to provide a cylinder differentiation signal. These sensors 11–13 are known in various types in the automobile art and may take any known types.

Figure 2:
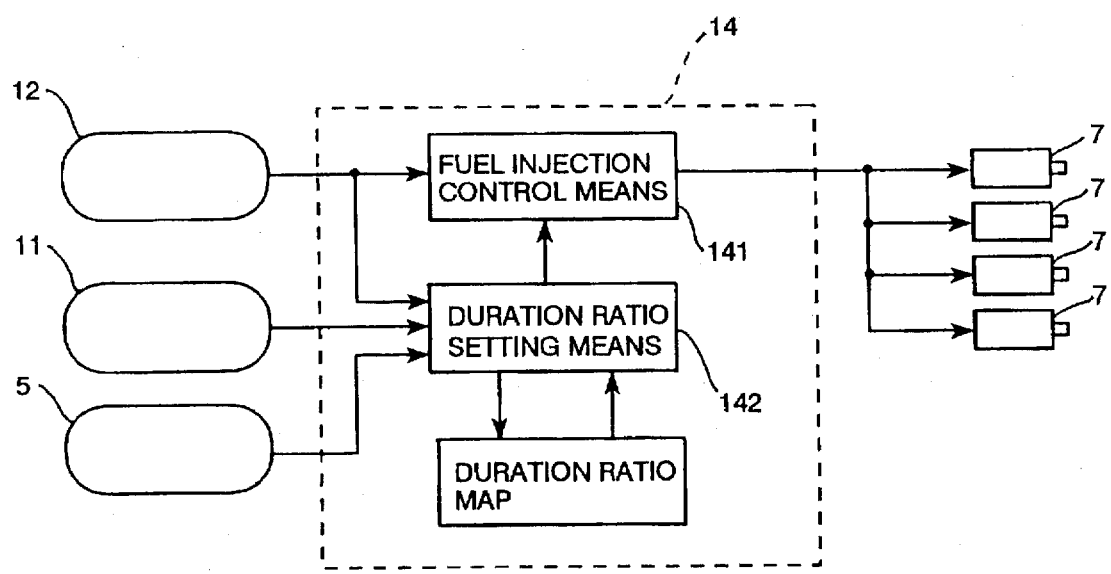
FIG. 2 is a block diagram showing an engine control unit for use in the engine control system of FIG. 1.

Signals from the speed sensor 5, position sensor 11, angle sensor 12 and cylinder differentiation sensor 13 are transmitted to an engine control unit (ECU) 14. The engine control unit 14 outputs control signals that activate and control fuel injectors 7, valve timing actuator 8, and ignition coils 10. As shown in FIG. 2, the engine control unit 14, which is comprised by, for instance, a microcomputer, consists of a divided injection control means 141 for executing divided fuel injection in which each fuel injector 7 executes fuel injection two times every four cycles or every engine cycle, and a duration ratio setting means 142 for establishing a duration ratio Div of divided fuel injection, namely leading fuel injection and trailing fuel injection. Specifically, injection of the necessitated amount of fuel is carried out partially during an interval or duration of leading injection Ti(I) before the intake valve opens and partially during an interval or duration of trailing injection Ti(t) after the valve have opened. The divided fuel injection ratio Div, i.e. the relative ratio between these durations of leading and trailing fuel injection Ti(I) and Ti(t), is altered according to changes in the intake valve duration Tv caused by the variable valve timing mechanism.

Divided fuel injection control means 141 computes the total amount of fuel to be delivered into the intake manifold every engine cycle on the basis of engine operating conditions, for instance, represented by the amount of intake air introduced into the intake manifold, and thereafter, computes the amount of fuel to be delivered into the intake manifold within the leading injection duration Ti(I) on the basis of the total amount of fuel.

After the leading fuel injection has been concluded to deliver the computed amount of fuel, the divided injection control means 141 computes the amount of fuel to be delivered into the intake manifold within the trailing injection duration Ti(I) during the intake stroke by subtracting the amount of fuel having been injected during the leading fuel injection from the total amount of fuel computed on the basis of updated engine operating conditions and controls the fuel injector 7 to execute the trailing fuel injection to deliver the computed amount of fuel into the intake manifold.

Duration ratio setting means 142 establishes a duration ratio Div of the leading injection duration Ti(I) relative to the trailing injection duration Ti(t) so as, on one hand, to increasingly change the leading injection duration Ti(I) by a specified time and, on the other hand, to decreasingly change the trailing injection duration Ti(t) by the same specified time when the intake valve duration Tv (which is determined by altering a time Vto at which the intake valve is opened Vto and a time Vtc at which the intake valve is closed in this embodiment) is shortened. The duration of fuel injection is changed by fixing the commencement of fuel injection at, for instance, an occurrence of a crank angle signal SGT and altering the end of the fuel injection. Besides, the trailing injection duration Ti(t) starts at the commencement of an intake stroke and terminates at a time before the intake valve closes. In this instance, the extended time by which the leading injection duration Ti(I) is changed is extended with an increase in engine speed Ne. Setting the duration ratio Div by means of the duration ratio setting means 142 is accomplished with the use of a duration ratio map (see FIG. 12) which is based on changes in intake valve duration Tv and engine speed Ne.

Figure 3:
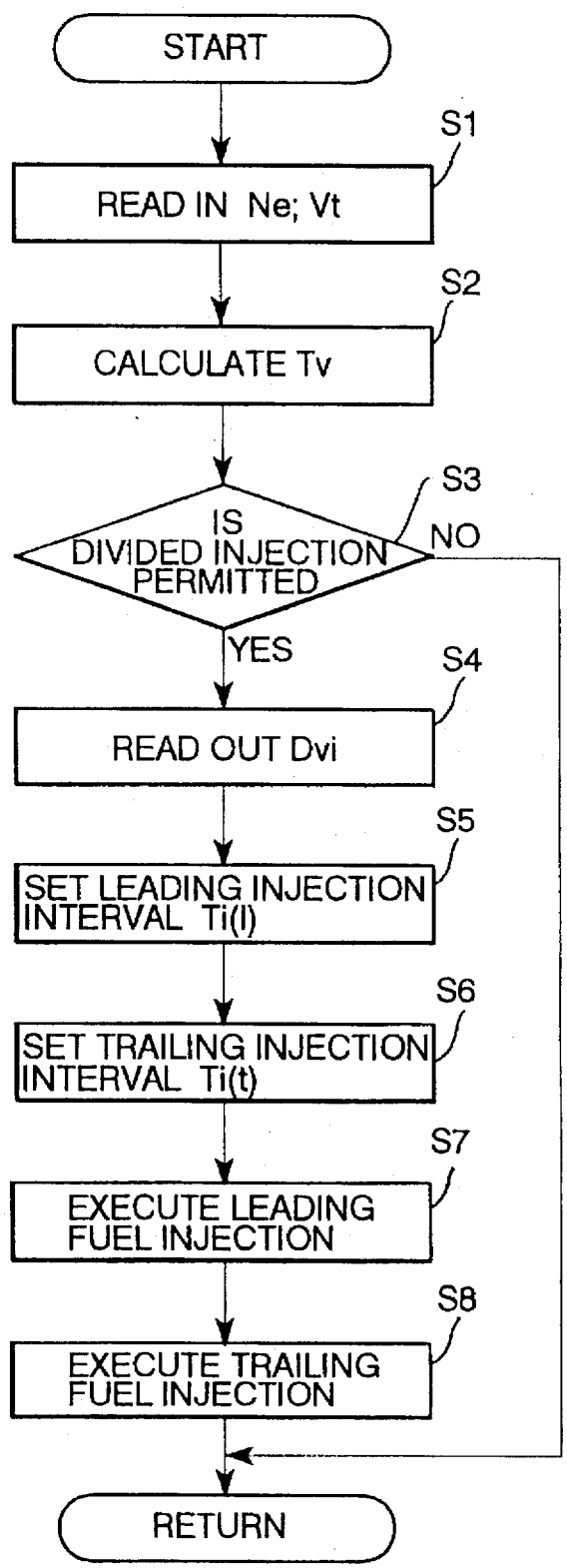
FIG. 3 is a flow chart illustrating a divided fuel injection control sequence routine for the engine control unit of FIG. 2.
Figure 4:
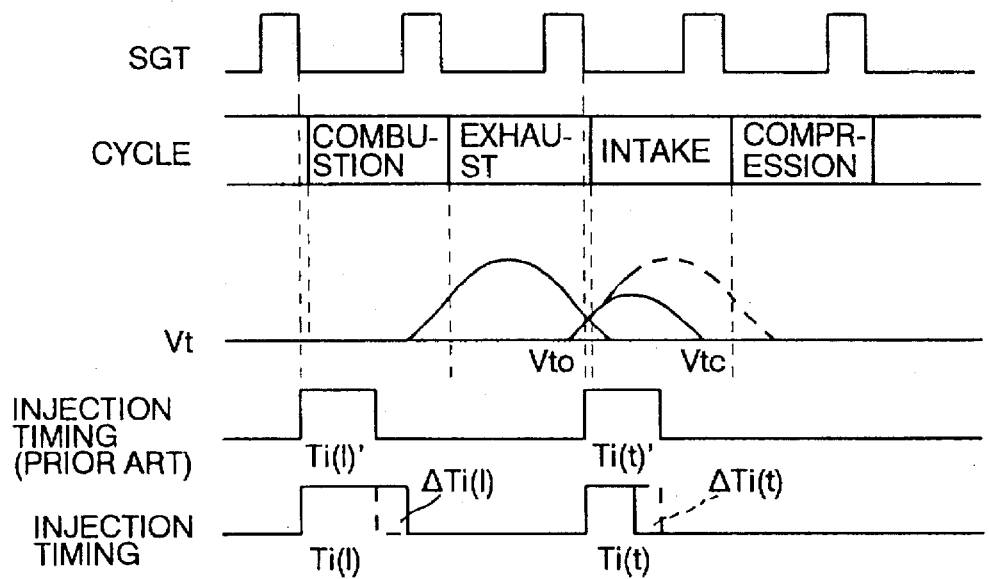
FIG. 4 is a time chart of the divided fuel injection control.

The divided fuel injection control of the engine control system depicted in FIGS. 1 and 2 is best understood by reviewing FIG. 3, which is a flow chart illustrating a fuel injection control routine for the microcomputer of the engine control unit 14 and FIG. 4, which is a time chart of fuel injection control.

In FIG. 3, the flow chart logic commences and control passes directly to function block at step S1 where an engine speed Ne and current valve open time Vo and valve close time Vc are read into the engine control system based on signals provided by the speed sensor 5 and the position sensor 11, respectively. Subsequently, at step S2, an intake valve duration Tv is computed from the valve open and close times Vto and Vtc. At step S3, the control system monitors engine operating conditions to make a determination as to whether the engine operating conditions have been ready for the divided fuel injection or not. This determination is necessary to avoid the divided fuel injection in the case where the engine is operating at a considerably low engine speed Ne, for instance, right after an engine start. If the answer to the determination is "NO", the control routine returns. On the other hand, the answer to the determination is "YES", then the control proceeds to step S4.

Figure 5:
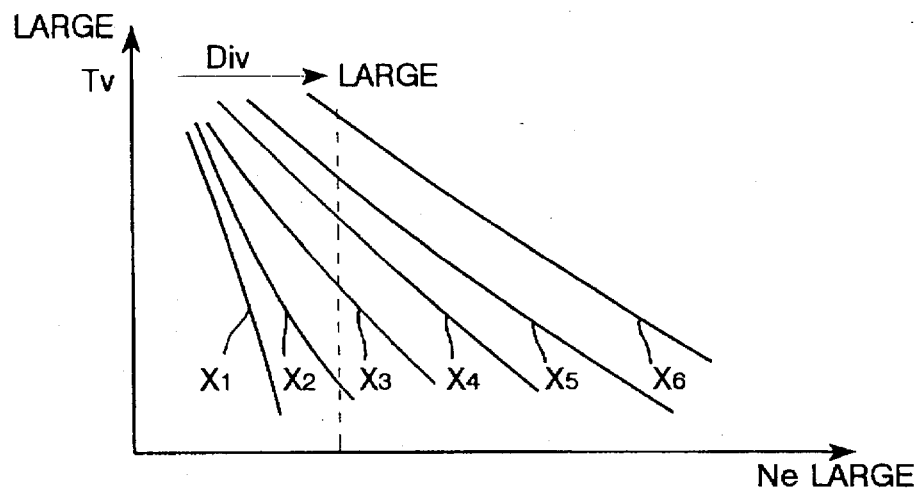
FIG. 5 is a map for use in setting a duration ratio between durations of leading and trailing fuel injection.

At step S4, an appropriate duration ratio Div is read from the duration ratio map shown in FIG. 5. In this instance, the duration ratio Div is read from either one of the duration ratio characteristic curves X1, X2, . . . (X1 X2<. . . ). That is, as was previously described, when the intake valve duration Tv is shortened, the duration ratio setting means 142 sets the duration ratio Div so that the duration of fuel injection is extended by the specified time for the leading injection and is complementarily shortened by the same specified time for the trailing fuel injection. The duration of each divided fuel injection is adjusted by fixing the commencement of fuel injection at an occurrence of a crank angle signal SGT and variably adjusting the termination of the fuel injection. Together, the extended time by which the leading injection duration Ti(I) is changed is extended with an increase in engine speed Ne. Setting the duration ratio Div is accomplished by the duration ratio setting means 142.

Thereafter, at steps S6 and S7, durations of leading and trailing fuel injections Ti(I) and Ti(t) in a divided fuel injection cycle are set for each fuel injector 7. Subsequently, at S7 and S8 each fuel injector 7 is activated to execute the divided fuel injection according the durations of leading and trailing fuel injection Ti(I) and Ti(t), after the fuel injection sequence returns to step S1.

In the embodiment of the invention described above, in an event where the intake valve duration Tv is altered, the duration ratio Div is established to, on one hand, extend the leading injection duration Ti(I) by the specific time with the effect of optimizing fuel vaporization and atomization, and to, on the other hand, shorten the trailing injection duration Ti(t). This specific relationship between the divided fuel injection is established when the intake valve duration Tv is shortened. As a result of establishing the duration ratio Div in this manner, it is made unnecessary to advance the commencement of trailing fuel injection, permitting the detection of engine operating conditions, such as the amount of intake air introduced into the intake system, which is necessary to determine the execution of trailing fuel injection, to be put off. Consequently, even during a great change in the amount of intake air, the trailing fuel injection is executed precisely in response to updated engine operating conditions.

Besides, the divided fuel injection in which the duration ratio Div is altered to extend the leading injection duration makes compensation for a shortage of fuel delivery which may be caused during the trailing fuel injection of the prior art divided fuel injection system in which the leading and trailing fuel injection are executed at a fixed proportion of, for instance, one to one, when the intake valve duration Tv is shortened and, as a result, suppresses undesirable fluctuations in air-to-fuel ratio. As shown in FIG. 4, the reduced time ΔTi(t) of the trailing injection duration Ti(t) is complementarily added as the extended time ΔTi(I) to the leading injection duration Ti(I) before the commencement of intake valve duration Tv. This proportional change in duration between the divided fuel injection has the effect of sufficient fuel vaporization and atomization in the interval from the extended fuel injection to the beginning of the intake valve duration Tv, which is always desirable to reduce useless fuel consumption and a hydrocarbon emission resulting from fuel combustion. In this instance, equalizing the extended time ΔTi(I) to be complementarily added to the initially established leading injection duration Ti(I) to the reduced time ΔTi(t) of the trailing injection duration Ti(t) results in improved control of fuel delivery in regard to the amount of intake air. Moreover, because the trailing injection duration Ti(t) is initiated at the time the intake valve starts to open and terminated before the intake valve closes, fuel delivery to the combustion chamber is smooth during the trailing fuel injection, thus resulting in improved combustion efficiency and reduced fuel consumption.

Because each of the leading injection duration Ti(I) and trailing injection duration Ti(t) is controlled by initiating the interval at fixed time, for instance at an occurrence of a crank angle signal SGT, and variably adjusting the termination of the interval, the divided fuel injection control is simplified due to divided fuel injection intervals controllable by simply adjusting the termination of each interval.

Moreover, because the extended time of the leading injection duration is increased with an increase in engine speed Ne, fuel delivery is assured in the higher range of engine speeds and is more precisely controlled in relation to engine operating demands.

Although, in the above embodiment, the intake valve duration is controlled by means of changing time of opening and closing the intake valve, it may be controlled by changing time of either opening or closing the intake valve. In place of the linear type variable valve time mechanism, the engine may incorporate a variable valve timing mechanism of what is called an ON/OFF type which changes the intake valve duration Tv between two durations, namely longer and shorter durations.

Figure 6:
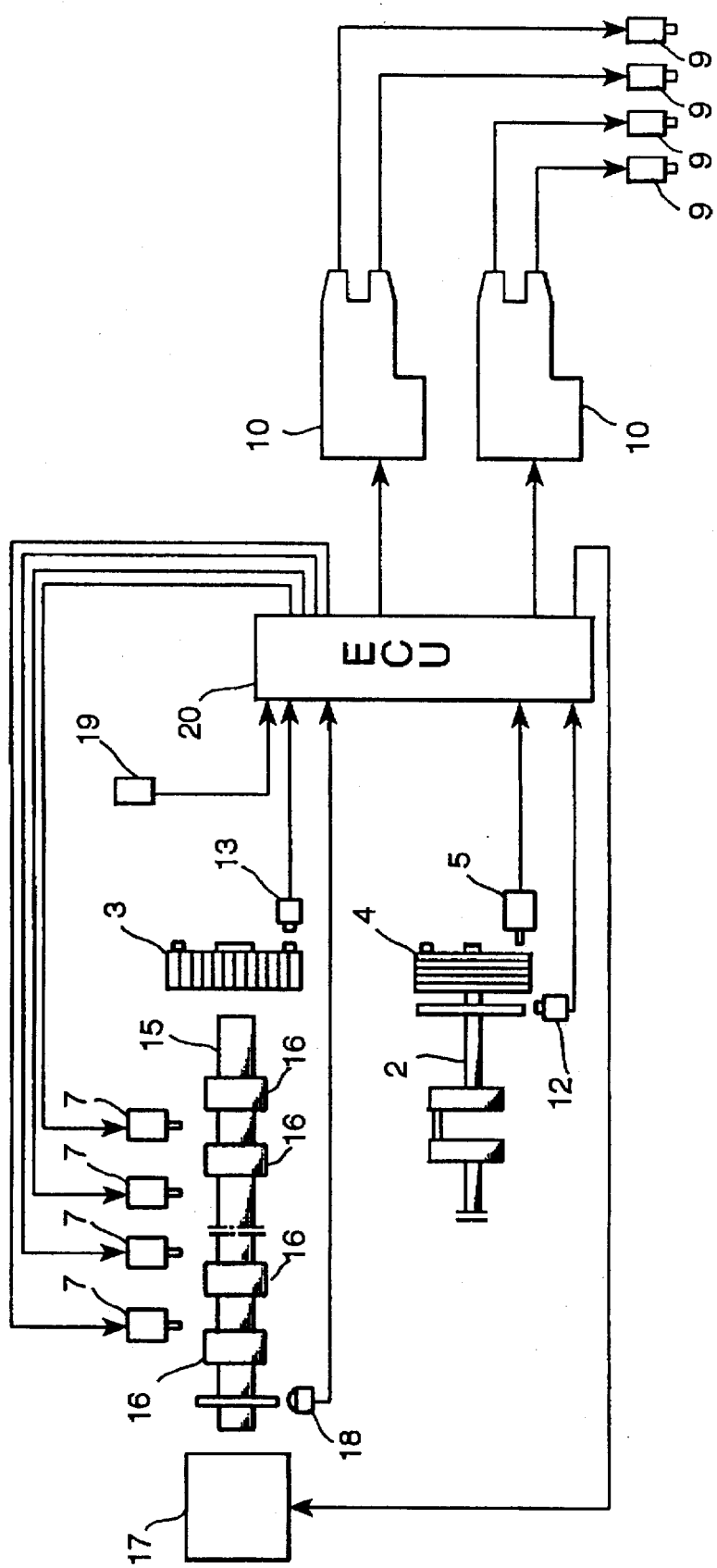
FIG. 6 is a schematic illustration of an engine control system in accordance with another embodiment of the invention.

FIG. 6 schematically shows an engine control system in accordance with another embodiment of the invention installed to, for instance, a four-cycle four-cylinder internal combustion engine. The engine has an intake camshaft 1 and a crankshaft 2 which are equipped with a camshaft pulley 3 and a crankshaft pulley 4, respectively. These pulleys 3 and 4 are operationally connected with each other and driven by means of a drive belt (not shown). The camshaft 1 incorporates eight cams 6, two cams for each cylinder (for example one S port and one for P port at each cylinder). Each cam lobe has a cylindrical profile in the axial direction. The rotational speed of the crankshaft pulley 4 is detected as the rotational speed of engine by means of a speed sensor 5 from which an engine speed signal Ne is output. The engine is provided with four fuel injection valves 7, each of which is installed to a separate cylinder (not shown).

Camshaft 1 is equipped with an actuator 17 forming part of a variable valve timing mechanism for causing a change in relative angular position between the camshaft 1 and the camshaft pulley 3, and hence the crankshaft 2, to alter a rotational phase of the cams 6 in regard to the crankshaft 1, whereby altering only time of opening and closing intake valves (not shown) linearly. The cylinders are respectively provided with ignition spark plugs 9 connected to the secondary circuits of ignition coils 10. One ignition coil 10 supplies a simultaneous spark to the first and fourth cylinders through the respective spark plugs 9, and the other ignition coil 10 supplies a simultaneous spark to the second and third cylinders through the spark plugs 9. The engine control system incorporates a position sensor 18 to monitor the angular position of the camshaft 1 and an air flow sensor 19 to detect the amount of intake air introduced into an intake manifold (not shown), as well as an angle sensor 12 the same as in the previous embodiment. These sensors 12, 18 and 19 are known in various types in the automobile art and may take any known types.

Figure 7:
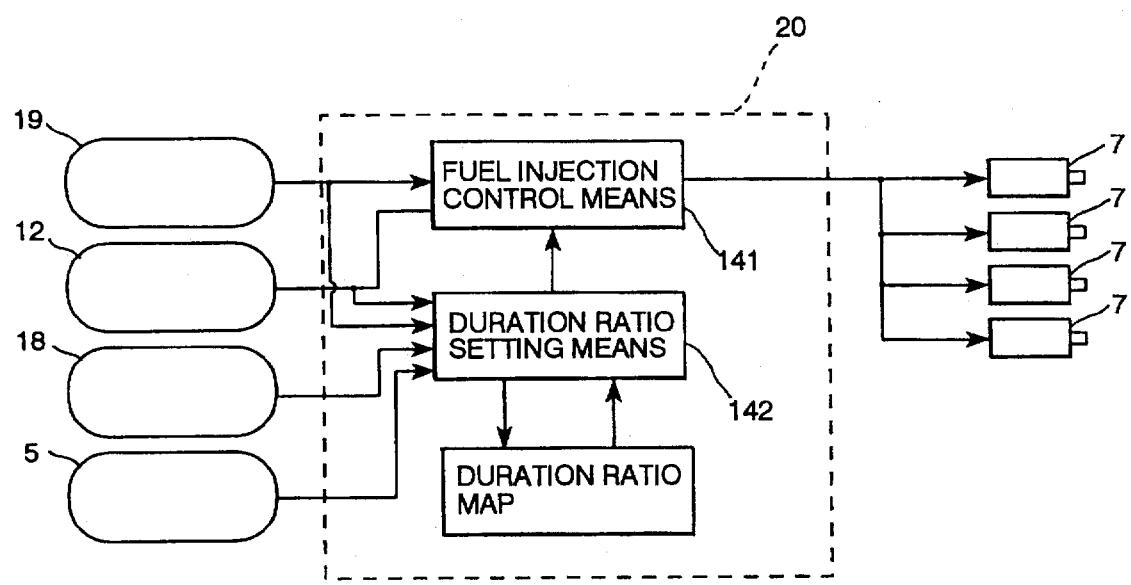
FIG. 7 is a block diagram showing an engine control unit for use in the engine control system of FIG. 6.

Signals from the speed sensor 5, angle sensor 12, position sensor 18, and air flow sensor 19 are transmitted to an engine control unit (ECU) 20 from which control signals are provided for the fuel injectors 7, actuator 17 and ignition coils 10. As shown in FIG. 7, the engine control unit 20, which is comprised by, for instance, a microcomputer, consists of a divided fuel injection control means 141 for causing the fuel injector 7 to execute fuel injection two times every engine cycle, and a duration ratio setting means 142 for establishing a duration ratio Div of these divided fuel injection, i.e. leading fuel injection and trailing fuel injection, according to a change in intake valve duration Tv (which is determined by altering an intake valve open time Vto and an intake valve close time Vtc in this embodiment) upon an occurrence of the change.

The fuel injection control means 141 computes the total amount of fuel to be delivered into the intake manifold every engine cycle on the basis of engine operating conditions, for instance, represented by the amount of intake air introduced into the intake manifold, and thereafter, further computes the amount of fuel to be delivered into the intake manifold within the leading injection duration Ti(I) on the basis of the total amount of fuel.

After the leading fuel injection has been concluded to deliver the computed amount of fuel, the fuel injection control means 141 makes another computation of the amount of fuel to be delivered into the intake manifold within the trailing injection duration Ti(I) in the intake stroke by subtracting the amount of fuel having been injected during the leading injection duration Ti(I) from the total amount of fuel computed on the basis of updated engine operating conditions and controls the fuel injector 7 to execute the trailing fuel injection to deliver the computed amount of fuel into the intake manifold.

Figure 11:
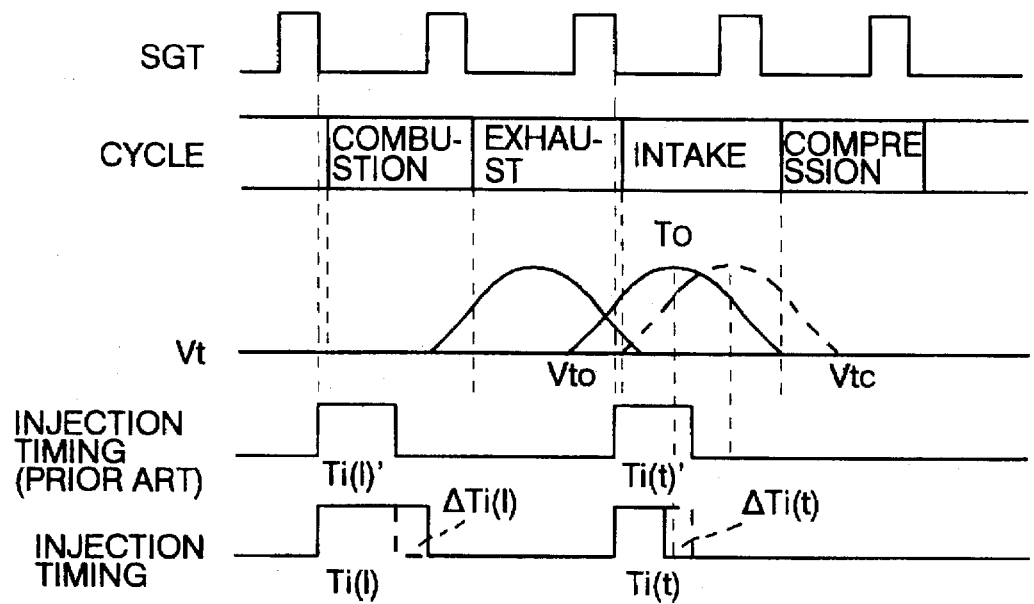
FIG. 11 is a time chart of the divided fuel injection control.

Duration ratio setting means 142 establishes a duration ratio Div of the leading injection duration Ti(I) relative to the trailing injection duration Ti(t) so as, on one hand, to increasingly change the leading injection duration Ti(I) by a specified time and, on the other hand, to decreasingly change the trailing injection duration Ti(t) by the same specified time when the intake valve duration Tv is shortened. The duration of fuel injection is controlled by fixing the commencement of fuel injection at, for instance, an occurrence of a crank angle signal SGT and variably adjusting the termination of the fuel injection. Together, the trailing injection duration Ti(t) is ranged from the commencement of an intake stroke to the maximum intake valve lift as shown in FIG. 11. In this instance, the extended time by which the leading injection duration Ti(I) is changed is extended with an increase in engine speed Ne. Setting the duration ratio Div by means of the duration ratio setting means 142 is accomplished with the use of a duration ratio map (see FIG. 5) which is based on changes in intake valve duration Tv and engine speed Ne.

Figure 8:
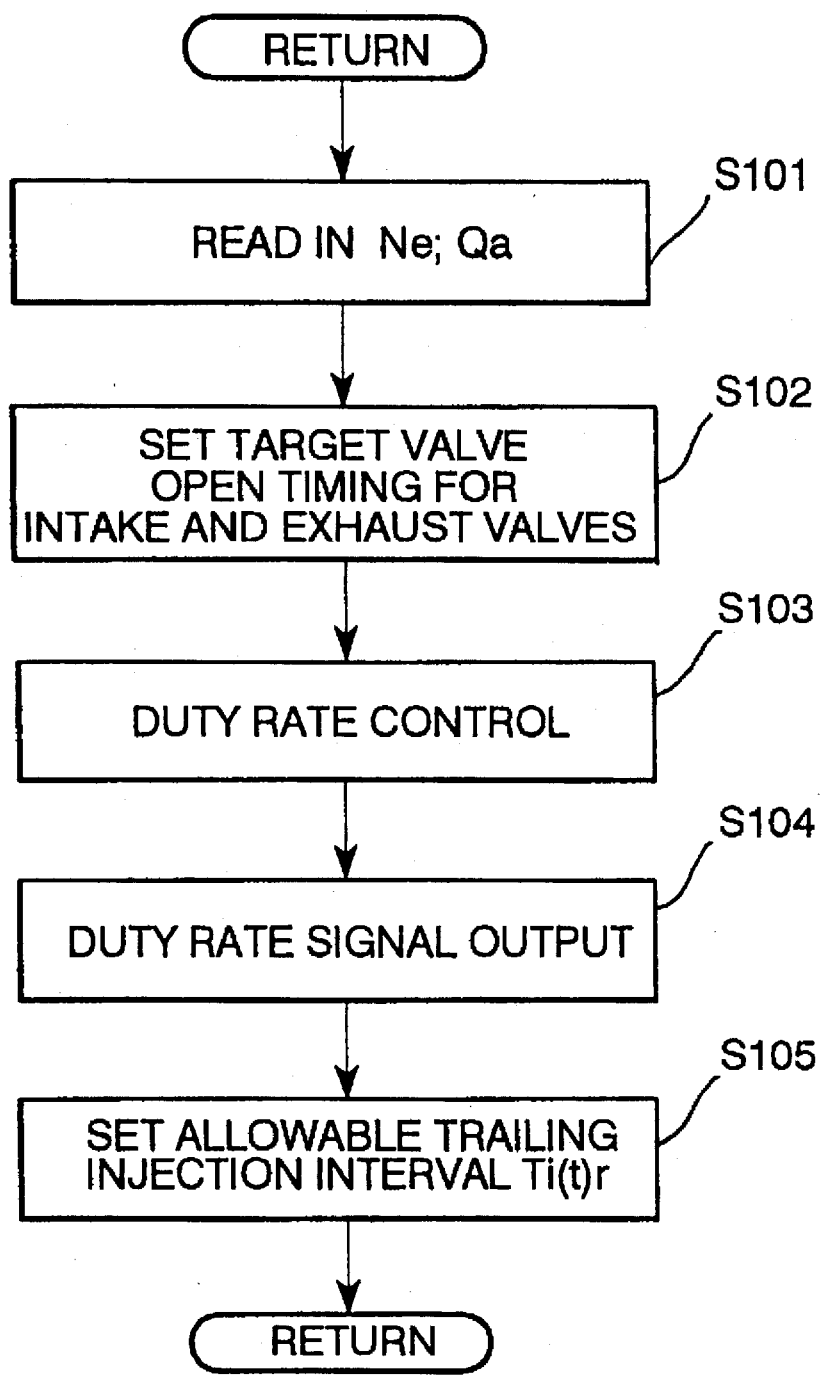
FIG. 8 is a flow chart illustrating a fuel injection control sequence routine for the engine control unit of FIG. 7.
Figure 9:
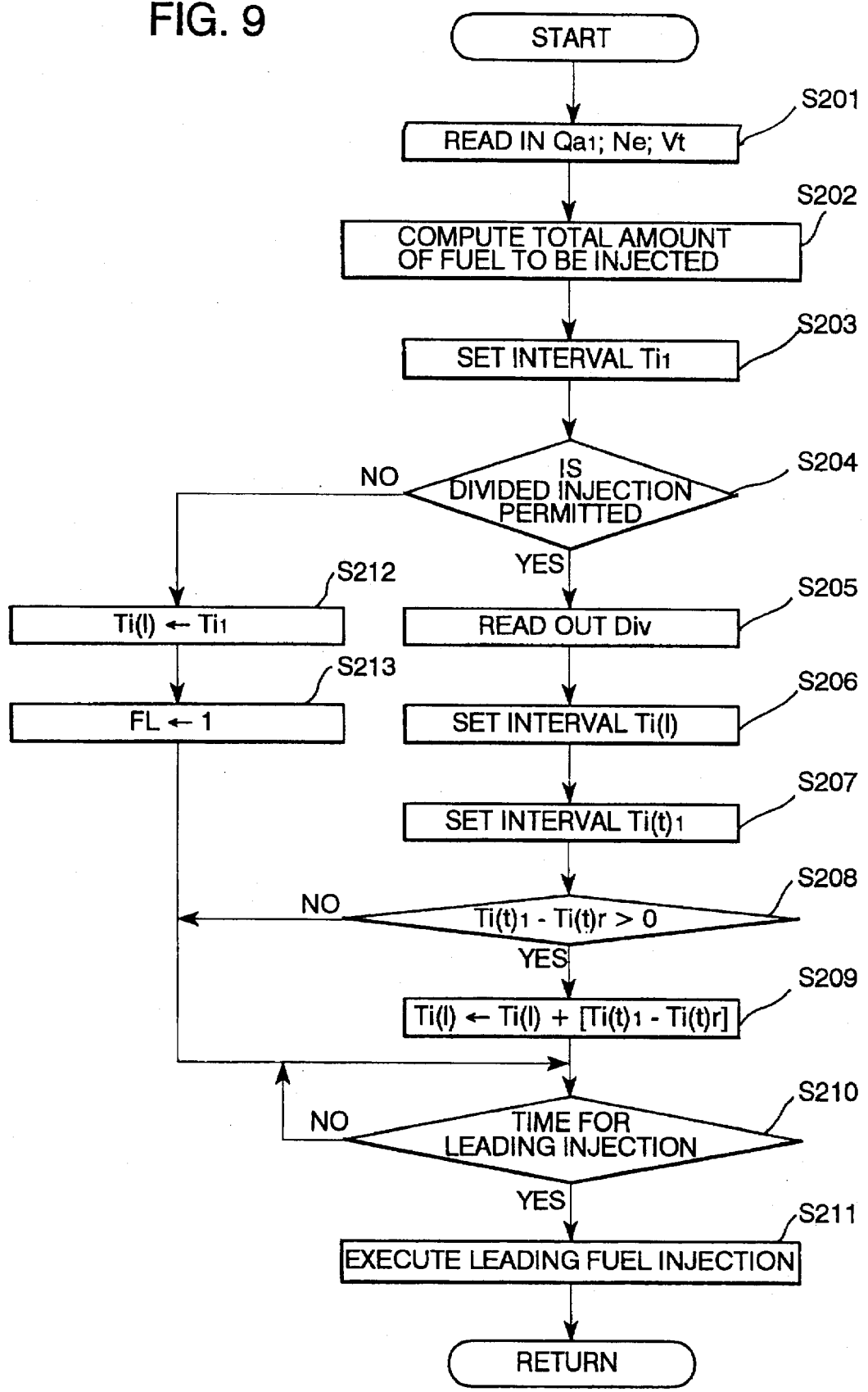
FIG. 9 is a flow chart illustrating a leading fuel injection control sequence routine for the engine control unit of FIG. 7.
Figure 10:
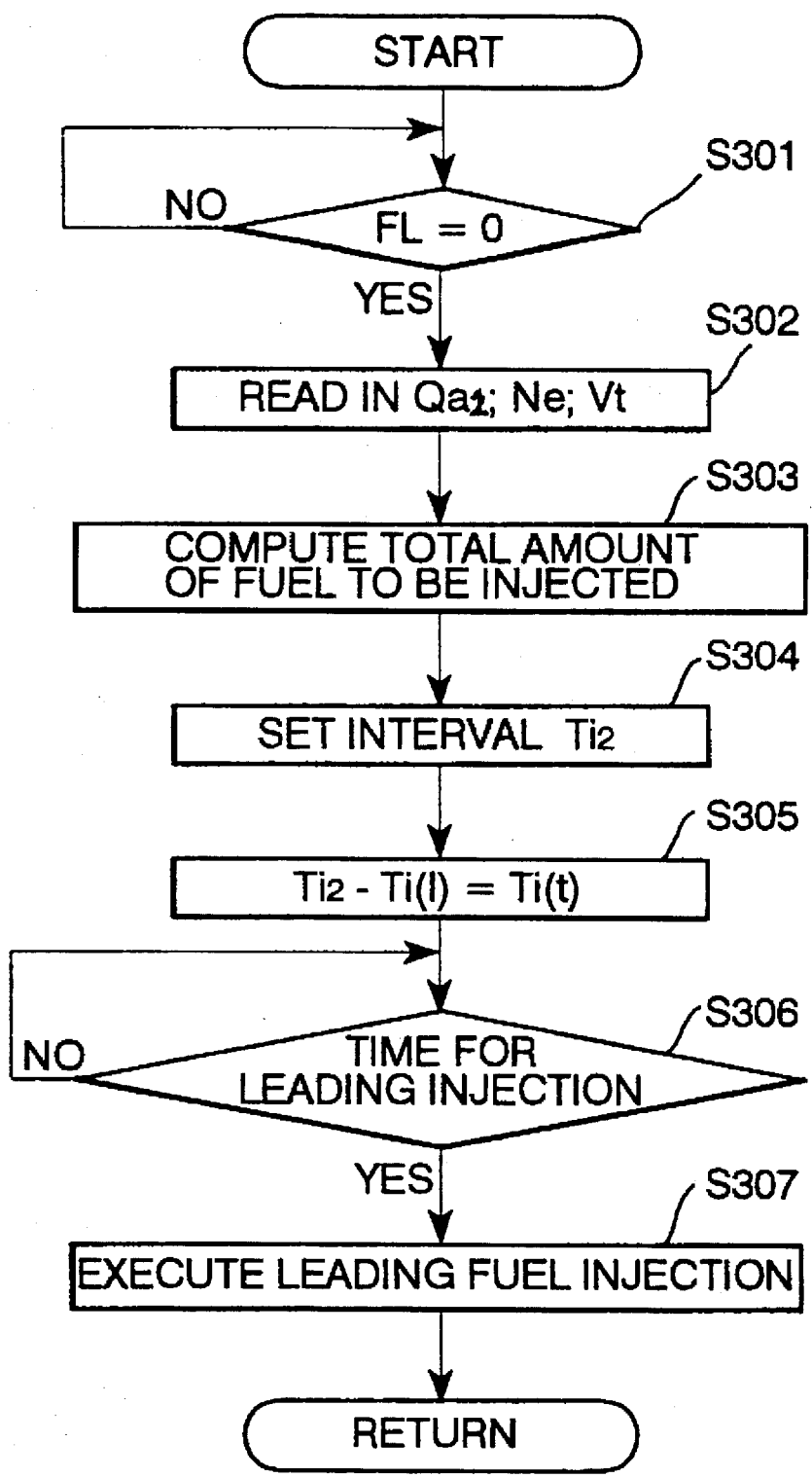
FIG. 10 is a flow chart illustrating a trailing fuel injection control sequence routine for the engine control unit of FIG. 7.

Divided fuel injection control of the engine control system depicted in FIGS. 6 and 7 is best understood by reviewing FIGS. 8 through 10, which are flow charts illustrating fuel injection control routines for the microcomputer of the engine control unit 20 and FIG. 11, which is a time chart of fuel injection control.

Figure 13:
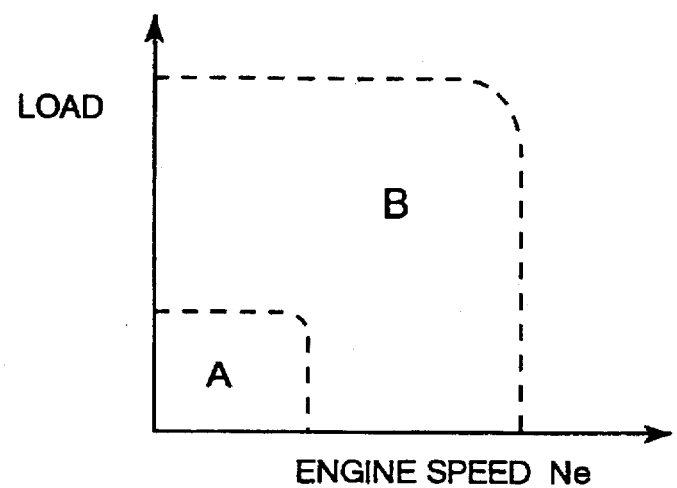
FIG. 13 is a map defining ranges of engine operating conditions for use in the divided fuel injection control.
Figure 14:
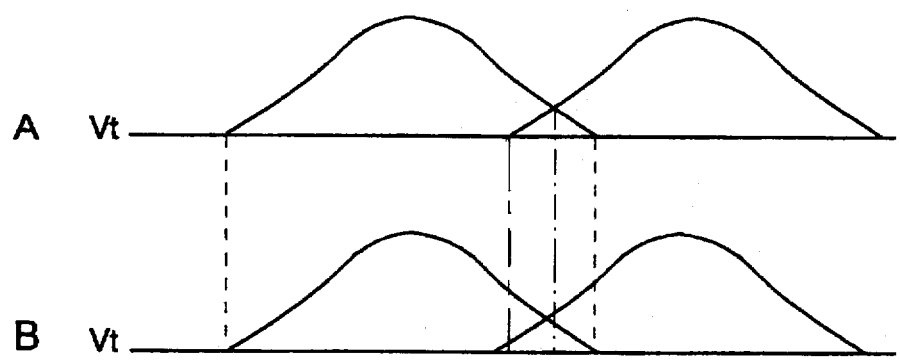
FIG. 14 is a valve timing map for the ranges of engine operating conditions for use in the divided fuel injection control.
Figure 15:
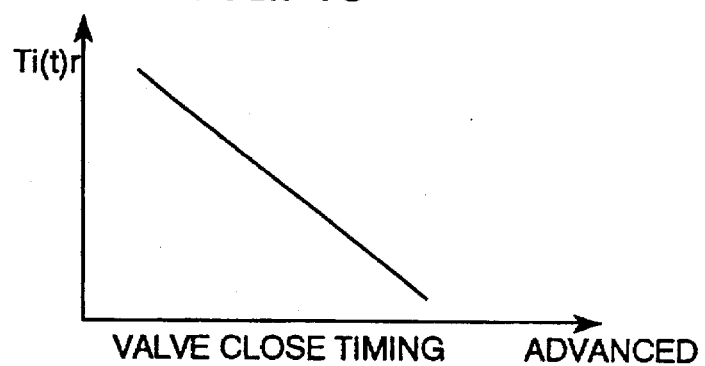
FIG. 15 is a map defining allowable amounts of fuel to be delivered in connection with timing of closing the intake valve for use in the divided fuel injection control.

In FIG. 3 which is a flow chart illustrating the valve timing control routine which is programmed to be repeatedly executed every five seconds, the flow chart logic commences and control passes directly to function block at step S101 where an engine speed Ne and the amount of intake air Qa introduced into the intake manifold are read into the engine control system based on signals provided by the speed sensor 5 and the air-flow sensor 20, respectively. Subsequently, at step S102, target valve open time are determined from an engine operating region map and a valve open and close time map as shown in FIGS. 13 and 14, respectively. For instance, engine operating conditions are divided into three regions, namely a region A, a region B and a region C as shown in FIG. 13. Timing of opening intake and exhaust valves are determined from time charts predetermined for the respective engine operating regions as shown in FIG. 14. Thereafter, a duty rate is controlled for the variable valve timing mechanism at step S103, and a control signal representative of the duty rate is output to the actuator 17 of the variable valve timing mechanism to adjust the time of closing the intake valve at step S104. Finally, based on the intake valve close time, an allowable trailing injection duration Ti(t)r is determined from an allowable duration map as shown in FIG. 15.

FIG. 9 shows a flow chart illustrating the leading fuel injection control routine. The flow chart logic commences and control passes directly to function block at step S201 where an engine speed Ne, intake valve time Vt and the amount of intake air $Qa_1$ introduced into the intake manifold immediately before the commencement of leading fuel injection are read into the engine control system. Subsequently, the total amount of fuel necessitated for the fuel injector to inject in one engine cycle is computed on the basis of the engine speed Ne and the amount of intake air $Qa_1$ at step S202 to establish an injection pulse width $Ti_1$ at step S203. At step S204, the control system monitors engine operating conditions and makes a determination as to whether the engine operating conditions have been ready for the divided fuel injection or not. This determination is necessary to avoid the divided fuel injection in the case where the engine is operating at a considerably low engine speed Ne, for instance, right after an engine start. If the answer to the determination is "NO", the control routine proceeds to step S212 as will be described later. On the other hand, the answer to the determination is "YES", then the control proceeds to step S205.

Figure 12:
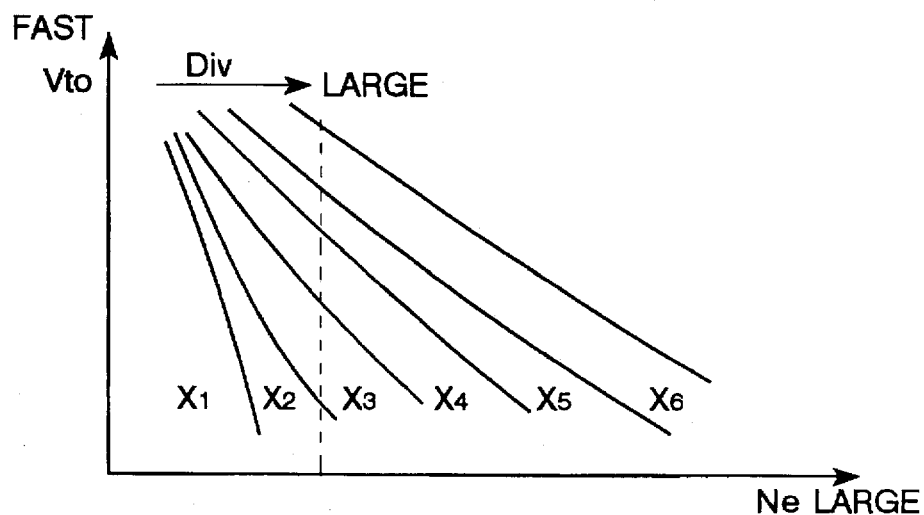
FIG. 12 is a map for use in setting a duration ratio between durations of leading and trailing fuel injection.

At step S205, an appropriate duration ratio Div is read from the duration ratio map shown in FIG. 12. This duration ratio Div is read from either one of the duration ratio curves X1, X2, ... (X1 X2<. . . ) defined in relation to engine speed Ne and intake valve open time Vto. That is, when the intake valve open time Vto is advanced, the duration ratio Div is set so that the injection interval is extended by a specified time for the leading fuel injection and is shortened by the same specified time for the trailing injection. The duration of each divided fuel injection is adjusted by fixing the commencement of fuel injection at, for instance, an occurrence of a crank angle signal SGT and variably adjusting the termination of the fuel injection. The trailing injection duration Ti(t) starts at the commencement of an intake stroke and terminates at a time before the intake valve closes as shown in FIG. 11. Together, the extended time by which the leading injection duration Ti(I) is changed is extended with an increase in engine speed Ne as understood from FIG. 12. Setting the fuel injection duration ratio Div is accomplished by the duration ratio setting means 142. Thereafter, leading and trailing injection durations Ti(I) and Ti(t) at this moment are set, at steps S206 and S207, respectively.

Incidentally, if the trailing injection duration Ti(t) thus determined exceeds the allowable trailing injection duration Ti(t)r determined in the variable valve timing control, there possibly fails in attaining the expected amount of fuel injection within a specified interval of intake stroke. For this reason, at step S208, a determination is made as to whether or not the trailing injection duration Ti(t) is greater than the allowable trailing injection duration Ti(t)r. If the answer to the determination is "YES", the leading injection duration Ti(I) is extended by the difference time ΔTi(t) between the trailing injection duration Ti(t) and allowable trailing injection duration Ti(t)r as an extended time ΔTi(I) at step S209. As a result of a determination made at step S210, if it is time to execute the leading fuel injection, the leading fuel injection starts and lasts fort this eventually extended leading injection duration Ti(I)+ΔTi(I) at step S211. At an conclusion of the leading fuel, another leading fuel injection control routine commences from step S101.

On the other hand, if the answer to the determination made at step S204 concerning engine operating conditions related to the divided fuel injection is "NO," this indicates that the divided fuel injection is not necessitated, then, after having substituted the injection pulse width $Ti_1$ established at step S203 for a leading injection duration Ti(I) at step S212, a divided injection flag F1 is up or set to "1" which indicates that any divided fuel injection has been executed, at step S213 and another leading fuel injection control routine subsequently commences from step S101.

Further, if, as a result of the determination made at step S208, the trailing injection duration Ti(t) is judged to be less than the allowable trailing injection duration Ti(t)r, the decision concerning the time of execution of the leading fuel injection is called for without extending the leading injection duration Ti(I) at step S209.

FIG. 10 is a flow chart illustrating the trailing fuel injection control routine. The flow chart logic commences and control passes directly to function block at step S301 where a determination is made as to whether the divided injection flag F1 has been down or set to "0" which indicates that the divided fuel injection has executed. Only when the answer to the determination is "YES," the flow chart logic proceeds forward. This determination is repeated until the divided injection flag F1 is down. At step S302, an engine speed Ne, intake valve time Vt and the amount of intake air $Qa_2$ introduced into the intake manifold immediately before the commencement of trailing fuel injection are read into the engine control system. Subsequently, the total amount of fuel necessary for one engine cycle is computed on the basis of the engine speed Ne and the amount of intake air $Qa_2$ at step S303 to establish an injection pulse width $Ti_2$ representative this updated total amount of fuel at step S304.

At step S305, the trailing injection duration Ti(t) is obtained as the difference between the injection pulse width $Ti_2$ and the leading injection duration Ti(I). Subsequently, at step S306, a determination is made as to whether or not it is time to execute the trailing fuel injection. If the answer to the determination is "YES", the trailing fuel injection is continuously executed for the trailing fuel injection interval Ti(I). This determination is repeated until the trailing injection time is attained. After the conclusion of the trailing fuel injection, another trailing fuel injection control routine subsequently commences from step S301.

As described above, in this embodiment, in the event where the fuel injection is executed two times every engine cycle when the intake valve duration Tv is altered, the duration ratio Div between leading and trailing injection durations, the leading injection duration Ti(I) is extended by a specific time and the trailing injection duration Ti(t) is shortened if the intake valve duration Tv is advanced. As a result, it is made unnecessary to advance the commencement of trailing fuel injection, permitting the detection of engine operating conditions (for instance, the amount of intake air), which is always necessary to determine the amount of fuel injection within the trailing injection duration Ti(t). Consequently, even during a great change in the amount of intake air, the trailing fuel injection is executed precisely in response to updated engine operating conditions with the result of a high efficiency of fuel delivery.

If it is expected to leave over a certain amount of fuel undelivered during the trailing injection duration Ti(t) when the intake valve duration Tv is advanced, the expected left-over amount of fuel is delivered in advance during the leading injection duration Ti(I) as a result of extending the leading injection duration Ti(I) by an extended time ΔTi(I) as indicated by solid line in FIG. 11, the efficiency of fuel delivery is further enhanced. Together, the divided fuel injection in which the fuel injection duration ratio Div is altered to extend the leading injection duration makes compensation for a shortage of fuel delivery which may be caused during the trailing fuel injection of the prior art divided fuel injection in which the leading and trailing fuel injection are executed at a fixed proportion of duration of, for instance, one to one, when the intake valve duration Tv is advanced. This proportional change in duration between the divided fuel injection has the effect of sufficient fuel vaporization and atomization in the interval from the extended fuel injection to the beginning of the intake valve duration Tv, which is always desirable to reduce useless fuel consumption and a hydrocarbon emission resulting from fuel combustion. In this instance, equalizing the extended time ΔTi(I) added to the leading injection duration Ti(I) to the reduced time ΔTi(t) removed from the trailing injection duration Ti(t) results in improved precise control of fuel delivery in regard to the amount of intake air. Moreover, because the trailing injection duration Ti(t) is initiated at the time the intake valve starts to open and terminated before the intake valve closes, fuel delivery into the combustion chamber is smooth during the trailing fuel injection, thus resulting in improved combustion efficiency and reduced fuel consumption. In addition, because each of the leading injection duration Ti(I) and trailing injection duration Ti(t) is controlled by initiating the interval at fixed time, for instance at an occurrence of a crank angle signal SGT, and variably adjusting the termination of the interval, the divided fuel injection control is simplified through the divided fuel injection of which the fuel injection intervals are set only by adjusting the termination of each interval.

Because each of the leading injection duration Ti(I) and trailing injection duration Ti(t) is controlled by initiating the interval at fixed time, for instance at an occurrence of a crank angle signal SGT, and variably adjusting the termination of the interval, the divided fuel injection control is simplified due to divided fuel injection intervals controllable by simply adjusting the termination of each interval, Moreover, because the extended time for the leading injection duration is increased with an increase in engine speed Ne, fuel delivery is assured in the higher range of engine speeds and is more precisely controlled in response to engine operating demands. In addition, because the trailing fuel injection is advanced to terminate before a time To at which the maximum intake valve lift occurs so as to provide a time interval to spare between the termination of the trailing fuel injection and the time To of the maximum intake valve lift, the trailing fuel injection is enabled to certainly terminate before the time To of the maximum intake valve lift due to the existence of the separable time interval even if, during a change in engine operating conditions, the amount of intake air is increased more within the duration of trailing fuel injection than within the leading injection duration, achieving the most suitable trailing fuel injection.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An engine control system for controlling an internal combustion engine equipped with a variable valve timing mechanism which alters intake valve duration, measured in degrees of engine crankshaft rotation, that an intake valve remains open, and one fuel injector for each cylinder in the engine which injects fuel into an intake manifold of the engine, said engine control system comprising:

fuel injection control means for causing said fuel injector to perform a plurality of times of fuel injection to deliver a total amount of fuel necessary every engine cycle into said intake manifold, said fuel injection including leading fuel injection terminating while an intake valve in said cylinder remains closed and trailing fuel injection terminating at a predetermined time in an intake cycle;

engine operating condition detecting means for detecting operating conditions of said engine;

fuel amount computing means for computing a total amount of fuel to be injected every engine cycle on the basis of engine operating conditions detected by said engine operating condition detecting means before said leading fuel injection, for computing a leading injection amount of fuel to be injected for a duration of time of said leading fuel injection, for computing a difference of an updated total amount of fuel to be injected every engine cycle, which is computed on the basis of engine operating conditions detected, after termination of said duration of time of said leading injection, by said engine operating condition detecting means, from said leading injection amount of fuel as a trailing injection amount of fuel to be injected for a duration of time of said trailing fuel injection; and duration ratio control means for controlling a relative ratio between said duration of time of said leading injection and said duration of time of said trailing injection in response to changes in said intake valve duration.

2. An engine control system as defined in claim 1, wherein said duration control means alters said relative ratio to cause a specified extension of said duration of time of said leading fuel injection in response to advancement of a termination of said intake valve duration and a reduction of said duration of time of said trailing fuel injection complementary to said specified extension.

3. An engine control system as defined in claim 2, wherein said fuel injection control means controls said duration of time of said leading fuel injection by initiating said leading fuel injection at a timing fixed relative to rotational angles of a crankshaft of the engine and retarding a termination of said leading fuel injection by a predetermined extension of time.

4. An engine control system as defined in claim 1, wherein said fuel injection control means initiates said trailing fuel injection at a timing fixed relative to rotational angles of a crankshaft of the engine regardless of changes in said intake valve duration to control said duration of time of said trailing fuel injection.

5. An engine control system as defined in claim 4, wherein said engine operating condition detecting means detects engine operating conditions, based on which said total amount of fuel is computed to determine an amount of fuel to be delivered during said leading fuel injection, immediately before initiation of said leading fuel injection.

6. An engine control system as defined in claim 5, wherein said engine operating condition detecting means detects updated engine operating conditions, based on which said updated total amount of fuel is computed to determine an amount of fuel to be delivered during said trailing fuel injection, immediately before initiation of said trailing fuel injection.

7. An engine control system as defined in claim 1, wherein said variable valve timing mechanism advances a termination of said intake valve duration with changes in engine load in a specified range of engine operating conditions.

8. An engine control system as defined in claim 1, wherein said duration control means alters said duration ratio to cause a specified reduction of said duration of time of said trailing fuel injection when said intake valve duration is shortened, and an extension of said duration of time of said leading fuel injection complementary to said specified reduction.

9. An engine control system as defined in claim 8, wherein said fuel injection control means initiates said duration of time of said trailing fuel injection when an intake cycle starts.

10. An engine control system as defined in claim 8, wherein said intake valve duration is adjusted depending upon closing said intake valve.

11. An engine control system as defined in claim 1, wherein said duration ratio control means alters said duration ratio to retard a termination of said leading fuel injection by a predetermined extension of time which is extended with an increase in engine speed.

12. An engine control system as defined in claim 11, wherein said duration ratio control means alters said duration ratio according to changes in said intake valve duration and engine speed.

13. An engine control system as defined in claim 12, wherein said duration ratio control means includes a map of duration ratio characteristic curves defined in relation to intake valve duration and engine speed.

* * * * *